United States Patent [19]
Sytsma

[11] Patent Number: 6,119,647
[45] Date of Patent: Sep. 19, 2000

[54] PISTON WITH BLOW-BY PRESSURE RELIEF

[75] Inventor: Steven J. Sytsma, Muskegon, Mich.

[73] Assignee: Dana Corporation, Toledo, Ohio

[21] Appl. No.: 09/405,740

[22] Filed: Sep. 24, 1999

[51] Int. Cl.[7] .................................................. F02F 3/22
[52] U.S. Cl. ......................................................... 123/193.6
[58] Field of Search .......................... 123/173.6; 92/186, 92/187

[56] References Cited

U.S. PATENT DOCUMENTS

| | | |
|---|---|---|
| 1,738,534 | 12/1929 | Johnson . |
| 1,754,404 | 4/1930 | Sandford . |
| 1,796,792 | 3/1931 | Johnson . |
| 2,066,489 | 1/1937 | Shannon . |
| 2,477,760 | 8/1949 | Mennie . |
| 2,653,065 | 9/1953 | Appleton . |
| 2,857,218 | 10/1958 | Pachernegg . |
| 3,336,844 | 8/1967 | Cornet ................................. 123/193.6 |
| 3,521,531 | 7/1970 | Kaesemodel . |
| 4,669,369 | 6/1987 | Holt et al. . |
| 5,546,896 | 8/1996 | Zaiser ................................. 123/193.6 |
| 5,737,999 | 4/1998 | Ariga . |
| 5,839,407 | 11/1998 | Suzuki et al. ........................ 123/193.6 |

*Primary Examiner*—Marguerite McMahon
*Attorney, Agent, or Firm*—Rader, Fishman & Grauer PLLC

[57] ABSTRACT

Pistons having holes extending from an outer face on piston lands to an interior portion of a piston are disclosed. The holes are used for venting blow-by gasses so that an oil control ring may more effectively scrape a cylinder wall. The holes are covered with special check valves to allow the gasses to be vented while not allowing oil to be pumped from the interior portion of the piston to the cylinder walls.

13 Claims, 2 Drawing Sheets

PISTON WITH BLOW-BY PRESSURE RELIEF

FIELD OF INVENTION

The present invention relates to an improved piston for an internal combustion engine. More specifically, the invention relates to a piston that vents blow-by gases and allows an oil control ring to more effectively scrape oil off a cylinder wall surrounding the piston.

BACKGROUND OF INVENTION

A piston reciprocating in a cylinder creates a great deal of friction between the outer surface of the piston and the adjacent cylinder wall of an internal combustion engine. Oil is used to lubricate the contacting surface between the piston and the cylinder wall. The oil used to lubricate tends to move up the cylinder wall, providing a smooth lubrication surface across which the piston may traverse. However, if the oil is allowed to move up the piston wall unrestrained, excess oil flows into the combustion chamber of the cylinder where it is ignited. Unrestrained oil flow not only wastes oil, but it causes the internal combustion engine to emit excess noxious gas. Consequently, at least one oil control ring is placed in an outer annular groove on the piston to scrape oil away from the combustion chamber. When gas that has been drawn into the combustion chamber is ignited and explodes, the piston is pushed away from the chamber by the force of the explosion. The oil control ring contacts the cylinder wall and scrapes oil away from the combustion chamber.

However, the oil control ring may not be able to quickly or effectively contact the cylinder wall due to pressure from blow-by gases that are created by the explosion in the combustion chamber. Blow-by gases tend to move out of the combustion chamber and down the cylinder wall. The pressure produced by the blow-by gases pushes the oil control ring away from the cylinder wall. Consequently, oil is not properly scraped away from the combustion chamber.

Pistons have been designed with openings used to either drain oil or to relieve blow-by gas pressure. However, holes used to vent blow-by gas are typically susceptible to a problem called reverse oil pumping where oil flows from the interior of the pistons through blow-by relief openings to the cylinder walls which actually allows more oil to get to the combustion chamber.

The present invention seeks to provide relief from blow-by gas pressure to allow an oil control ring to more effectively scrape a cylinder wall while avoiding the problem of reverse oil pumping.

SUMMARY OF INVENTION

According to a first embodiment of the present invention there is provided a piston for an internal combustion engine comprising an end surface selectively received in a combustion chamber of the engine and an outer surface generally perpendicular to said end surface. A first annular groove is formed in the outer surface of the piston, the first groove adapted to receive an oil control ring. A second annular groove is formed in the outer surface, the second annular groove adapted to receive a ring and the second groove being a shorter distance from the end surface than the first groove. A land is disposed between the first groove and the second groove, the land having an outer face and a hole extending from the outer face to an interior portion of the piston. A check valve allows gas flow from the outer face to the interior portion and limits gas flow from the interior portion to the outer face such that blow-by gas may be vented and reverse oil flow is minimized.

According to a second embodiment of the present invention there is provided a piston for an internal combustion engine comprising an end surface selectively received in a combustion chamber of the engine and an outer surface generally perpendicular to the end surface. A first annular groove is formed in the outer surface, the first groove adapted to receive an oil control. A second annular groove is formed in the outer surface, the second groove adapted to receive a ring and the second groove being a shorter distance from the end surface than the first groove. A third annular groove is also formed in the outer surface, the third groove adapted to receive a ring and the third groove being a shorter distance from the end surface than the second groove. A land is disposed between the third groove and the second groove, the land having an outer face and a hole extending from the outer face to an interior portion of the piston. A check valve allows gas flow from the outer face to the interior portion and limits gas flow from the interior portion to the outer face such that blow-by gas may be vented and reverse oil flow is minimized.

DETAILED DESCRIPTION OF THE PREFERRED EMBODIMENTS

Figure 1:
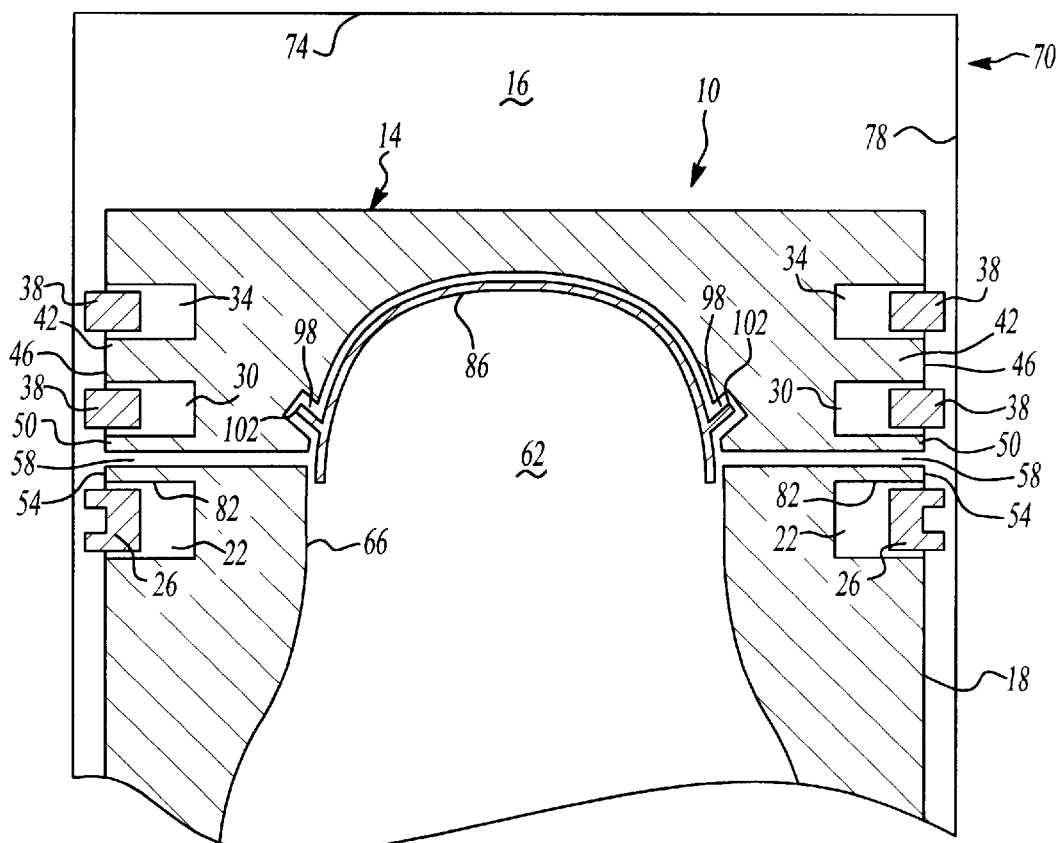
FIG. 1 illustrates a cross-section of one embodiment of a piston and cylinder according to the present invention.

FIG. 1 illustrates a piston 10 according to one embodiment of the present invention. Piston 10 includes an end surface 14 selectively received in a combustion chamber 16 of an internal combustion engine (not shown) and an outer cylindrical surface 18 generally perpendicular to end surface 14.

Outer cylindrical surface 18 has a first annular groove 22 adapted in size to receive an oil control ring 26 and a second and third annular groove 30, 34 both adapted in size to receive piston rings 38. Piston rings 38 are typically compression rings, but may also be other kinds of rings known in the art. Furthermore, there are many different types of oil control rings 26 that are known and may be used in the present invention.

Second annular groove 30 and third annular groove 34 are separated from each other by a land 42. Land 42 has an outer face 46. First annular groove 22 and second annular groove 30 are also separated from each other by a land 50. Land 50 also has an outer face 54.

Land 50 has holes 58 extending from outer face 54 to an interior portion 62 of piston 10. Interior portion 62 is defined by an inner surface 66.

During operation of an internal combustion engine, piston 10 reciprocates in a cylinder 70. Cylinder 70 includes a head 74 and a cylinder wall 78. Piston 10 moves toward the head 74 during a compression stroke and compresses fuel and gasses in combustion chamber 16 that were allowed in through an intake valve (not shown). The fuel and gasses are ignited to begin the power stroke, pushing piston 10 away from head 74. As piston 10 moves away from cylinder head 74, oil control ring 26 is supposed to move into abutting contact with an annular wall 82 of annular groove 22. Oil control ring 26 then scrapes oil from cylinder wall 78 away from cylinder head 74.

In a normal piston, the power stroke produces the aforementioned blow-by gasses that have a tendency to move down cylinder wall 78, past piston rings 38, where they provide pressure against oil control ring 26. The pressure pushes oil control ring 26 out of abutting relation with annular wall 82 destabilizing ring 26. Further, the blow-by gasses tend to push past oil control ring 26 making it very difficult for oil control ring 26 to keep contact with cylinder wall 78 and scrape oil therefrom.

Consequently, piston 10 is fitted with holes 58. Blow-by gases that push past piston rings 38 are allowed to pass through holes 46 allowing oil control ring 26 to more effectively scrape cylinder wall 78.

Although preferred, third groove 34 and its corresponding piston ring 38 are not necessary for the embodiment of the invention shown in FIG. 1 to function. The invention will function with only second groove 30 and its corresponding piston ring 38 plus first groove 22 and its corresponding oil control ring 26.

While holes 58 solve the blow-by gas pressure problem, they present a new problem that the present invention has also solved. After the power stroke of piston 10 is complete, piston 10 begins an exhaust stroke moving back toward cylinder head 74 and pushing remaining exhaust gases out of combustion chamber 16 of cylinder 70 through an exhaust valve (not shown). Piston 10 then moves away from head 74 to perform an intake stroke creating a partial vacuum in cylinder 70 thereby pulling fuel into cylinder 70 through the intake valve (not shown). If holes 58 are left unrestricted during the intake stroke, the vacuum tends to pull oil and gas from interior portion 62 of piston 10 back to cylinder walls 78. The result is a phenomenon called reverse oil pumping or reverse oil flow which, if allowed to occur, would defeat the purpose of holes 58 in allowing oil control ring 26 to more effectively scrape oil from cylinder wall 78.

Figure 2:
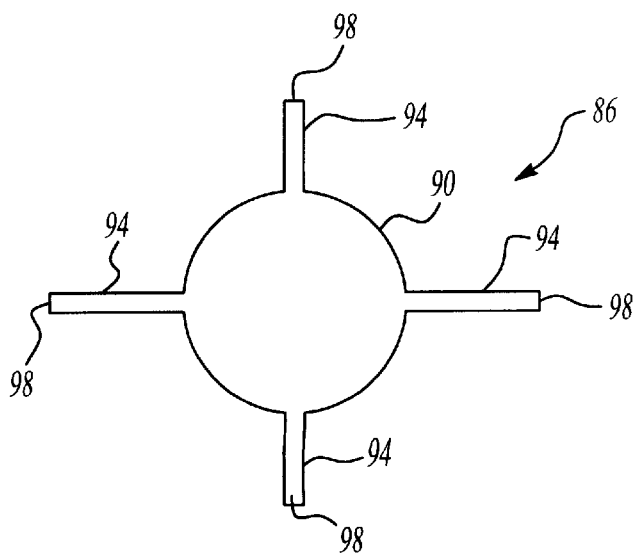
FIG. 2 illustrates a top view of one embodiment of a check valve according to the present invention.

Consequently, interior portion 62 is fitted with a check valve 86. One preferred embodiment of check valve 86 may be a metal insert having a spider like configuration as shown in FIGS. 1 and 2 with a central portion 90 and legs 94. Central portion 90 may be almost any size and shape as long as it fits within piston 10 and connects to legs 94. Typically, central portion 90 will be a thin plastic or metal piece that is molded or shaped to conform to the inner surface 66 of interior portion 62 of piston 10. Central portion 90 should have as many legs 94 as there are holes 58 in piston 10. One leg 94 should extend to cover each hole 58. Referring to FIG. 1, each leg 94 may have a locating protrusion 98 that extends into a bore 102, each bore 102 positioned near one hole 58 to positively position a portion of one leg 94 over that hole 58. The check valve 86 should fit snugly into inner surface 66 and protrusions 98 should create an interference fit with bores 102 to hold check valve 86 in place. Protrusions 98 may be molded metal or plastic that extends into bores 102 or protrusions 98 may be dented out portions of check valve 86 that extend into a correspondingly shaped bores 102.

In another embodiment of the invention, check valve 86 may not have a body portion 90, and may only include legs 94 that cover holes 58.

Legs 94 may be made of a thin plastic or metal material. The plastic or metal should flex inwardly toward interior portion 62 of piston 10 under the pressure of the blow-by gases coming through holes 58. Unless biased away by blow-by gas coming through holes 58, legs 94 should cover holes 58 to prevent reverse oil flow.

Figure 3:
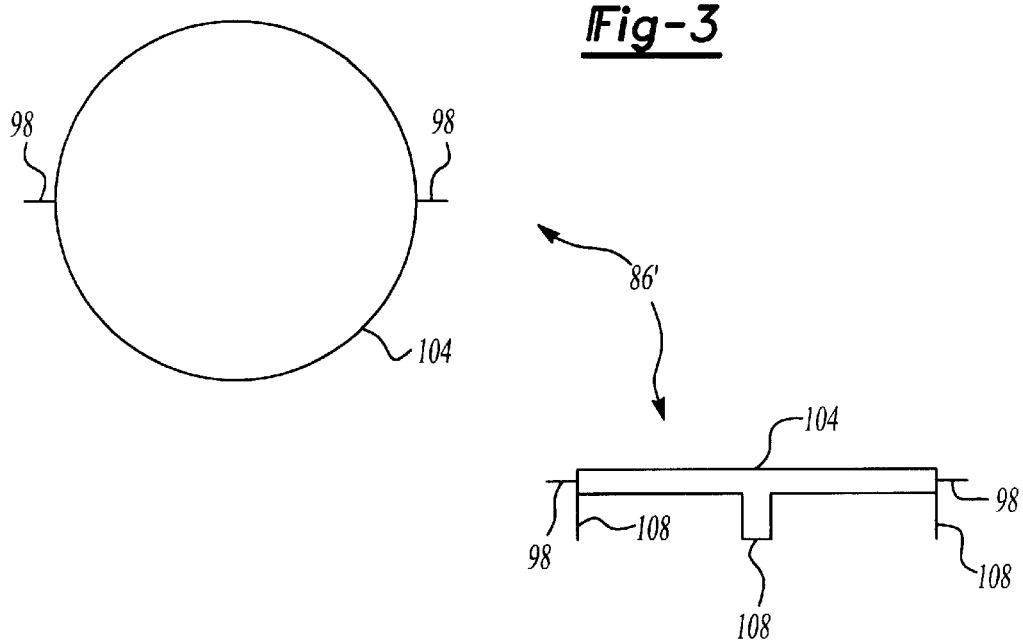
FIG. 3 illustrates a top view and a side view of one embodiment of a check valve according to the present invention.

FIG. 3 illustrates another embodiment of check valve 86'. FIG. 3 includes a top view and a side view of check valve 86'. Check valve 86' includes an inner ring 104, inner ring 104 having one or more locating protrusions 98 and a sufficient number of extensions 108 to cover holes 58. Referring to FIGS. 1 and 3, the locating protrusions 98 of check valve 86' would extend into bores 102 just like the protrusions 98 of the spider configuration previously discussed. However, locating protrusions 98 on inner ring 104 could be placed anywhere on the outer circumference of inner ring 104 as long as bores 102 are placed correspondingly in inner surface 66 of piston 10 such that extensions 108 cover holes 58.

Generally, check valve 86 may be of any configuration that allows gas flow from outer face 54 to interior portion 62 and limits gas and oil flow from interior portion 62 to outer face 54 such that blow-by gas are vented and reverse oil flow is minimized. The embodiments of check valves 86, 86' illustrated in FIGS. 2 and 3 are a few of many possible configurations that place a substantially flat metal or plastic material over holes 58 where the flat metal or plastic material flexes inwardly during the power stroke to vent blow-by gases and covers holes 58 during the intake stroke to prevent reverse oil flow. Check valves 86 of this type may be manufactured both quickly and inexpensively using conventional plastic or metal molding techniques.

Figure 4:
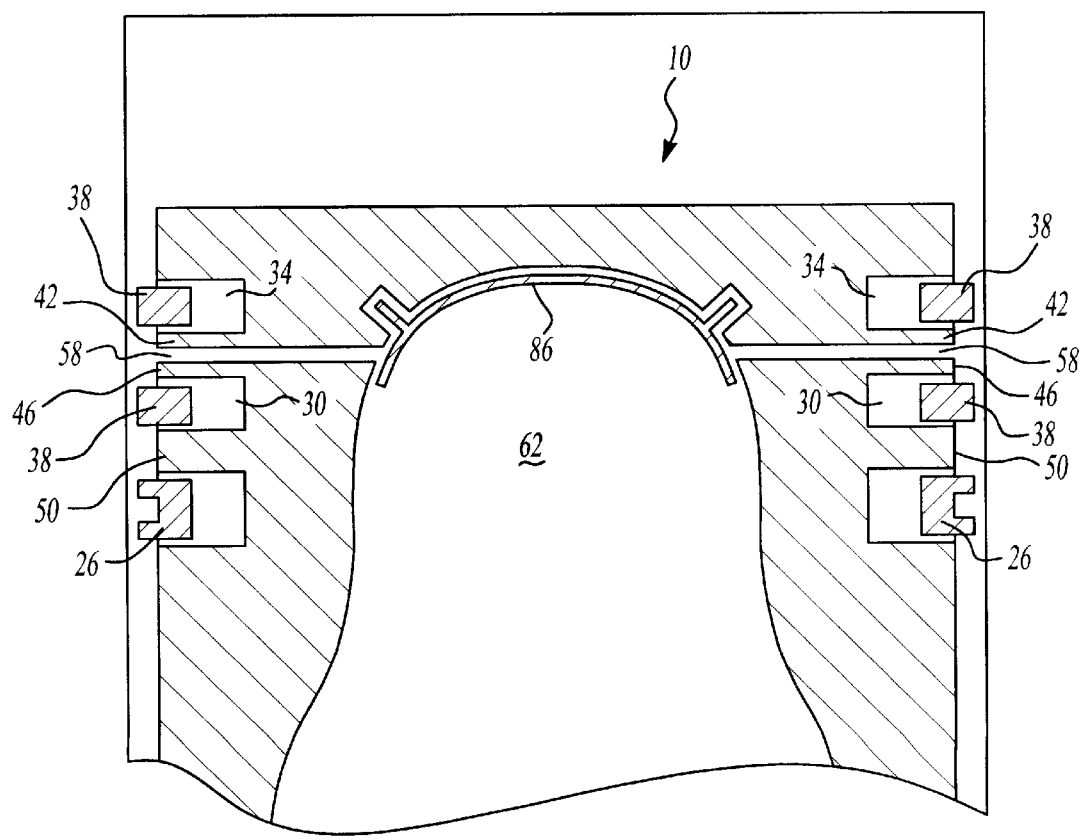
FIG. 4 illustrates a cross-section of another embodiment of a piston and cylinder according to the present invention.

FIG. 4 illustrates another possible embodiment of the present invention. Holes 58 extend from outer face 46 of land 42 to interior portion 62 of piston 10. Having holes 58 placed between piston rings 38 allows piston 10 to vent blow-by gasses before the gasses even reach land 50 or oil control ring 26. The blow-by gasses that make it past third annular groove 34 are quickly vented through holes 58 and the gasses will not be able to provide enough pressure to push past second annular groove 30. Consequently, oil control ring 26 is free to operate with very little or no interference from blow-by gasses. Of course, check valve 86 has to be modified in this particular embodiment to place metal or plastic material over holes 58 in their new positions.

The embodiment of FIG. 4 includes a further advantage. Typically, groove 30 is deeper as compared to groove 34 to relieve pressure. Through the use of the present invention, groove 30 may be made the same depth as or even a shallower depth as compared to groove 34. Thus, there is a significantly smaller gap and potential oil flow path as piston 10 moves upward, reducing unwanted oil deposit on the mating cylinder wall.

The disclosed embodiments and examples are given to illustrate the present invention. However, they are not meant to limit the scope and spirit of the present invention. Therefore, the present invention should be limited only by the appended claims.

What is claimed is:

1. A piston for an internal combustion engine comprising:
   an end surface;
   an outer surface generally perpendicular to said end surface;
   a first annular groove formed in said outer surface, said first groove adapted to receive an oil control ring;
   a second annular groove formed in said outer surface, said second groove adapted to receive a ring and said second annular groove being a shorter distance from said end surface than said first annular groove;

a land disposed between said second groove and said first groove, said land having an outer face and a hole extending from said outer face to an interior portion of said piston;

a check valve allowing gas flow from said outer face to said interior portion and limiting gas flow from said interior portion to said outer face such that blow-by gas may be vented and reverse oil flow is minimized.

2. A piston as in claim 1, further comprising a third annular groove formed in said outer surface, said third groove adapted to receive a ring, said third annular groove being a shorter distance from said end surface than said second annular groove.

3. A piston as in claim 1, wherein said check valve includes at least one locating protrusion for positively positioning said check valve.

4. A piston as in claim 1, wherein said check valve has a spider-like configuration.

5. A piston as in claim 1, wherein said check valve includes an inner ring and a radially extending extension, said extension corresponding to said hole.

6. A piston as in claim 1, wherein said check valve places a flexing material over said hole.

7. A piston as in claim 1, wherein said check valve is biased against said hole.

8. A piston for an internal combustion engine comprising:

an end surface;

an outer surface generally perpendicular to said end surface;

a first annular groove formed in said outer surface, said first groove adapted to receive an oil control ring;

a second annular groove formed in said outer surface, said second groove adapted to receive a ring and said second groove being a shorter distance from said end surface than said first groove;

a third annular groove formed in said outer surface, said third groove adapted to receive a ring and said third groove being a shorter distance from said end surface than said second groove;

a land disposed between said third groove and said second groove, said land having an outer face and a hole extending from said outer face to an interior portion of said piston; and a check valve allowing gas flow from said outer face to said interior portion and limiting gas flow from said interior portion to said outer face such that blow-by gas may be vented and reverse oil flow is minimized.

9. A piston as in claim 8, wherein said check valve includes a locating protrusion for positively positioning said check valve.

10. A piston as in claim 8, wherein said check valve has a spider-like configuration.

11. A piston as in claim 8, wherein said check valve includes an inner ring and a radially extending extension, said extension corresponding to said hole.

12. A piston as in claim 8, wherein said check valve places a flexing material over said at least two holes.

13. A piston as in claim 8, wherein said check valve is biased against said hole.

* * * * *